United States Patent
Bickett et al.

(10) Patent No.: US 10,779,512 B1
(45) Date of Patent: Sep. 22, 2020

(54) QUICK RELEASE DEVICE

(71) Applicants: Kim D. Bickett, Ridgway, IL (US); John D. Kramer, Waverly, KY (US)

(72) Inventors: Kim D. Bickett, Ridgway, IL (US); John D. Kramer, Waverly, KY (US)

(*) Notice: Subject to any disclaimer, the term of this patent is extended or adjusted under 35 U.S.C. 154(b) by 399 days.

(21) Appl. No.: 15/724,900

(22) Filed: Oct. 4, 2017

Related U.S. Application Data

(60) Provisional application No. 62/409,593, filed on Oct. 18, 2016.

(51) Int. Cl.
*A01K 27/00* (2006.01)

(52) U.S. Cl.
CPC .......... *A01K 27/005* (2013.01); *A01K 27/009* (2013.01)

(58) Field of Classification Search
CPC ........................................... A01K 27/004–009
USPC .......................................................... 119/776
See application file for complete search history.

(56) References Cited

U.S. PATENT DOCUMENTS

| | | | | |
|---|---|---|---|---|
| 2,144,813 A * | 1/1939 | Roan | B60Q 1/36 | 340/487 |
| 3,027,130 A * | 3/1962 | Stumpff | B68C 1/20 | 248/309.1 |
| 3,505,979 A * | 4/1970 | Rosswag | A01K 27/005 | 119/772 |
| 5,100,192 A * | 3/1992 | McMillan | B63B 21/04 | 294/82.31 |
| 5,261,260 A * | 11/1993 | Lin | A01K 1/034 | 292/144 |
| 5,534,852 A * | 7/1996 | Schuett | A01K 15/02 | 318/16 |
| 6,230,663 B1 * | 5/2001 | Welch | A01K 27/005 | 119/772 |
| 6,352,053 B1 * | 3/2002 | Records | A01K 15/02 | 119/712 |

(Continued)

*Primary Examiner* — Ebony E Evans
(74) *Attorney, Agent, or Firm* — Gary K. Price

(57) ABSTRACT

A quick release device that includes a base member and an arm hingedly attached to the base member. In application, an opposite end of the tether can be tied to an anchor disposed on a lower portion of the base member and a first end of the tether is passed through the hunting dog's collar between the dog's neck area and collar, and then passed between the base member and arm while in the open, unlocked position. Urging the arm to the locked position catches and secures the first end of the tether so that the hunting dog is releasably secured. Transmitting a radio signal from the remotely located radio transmitter to the radio receiver, will cause the solenoid to disengage the coupling mechanism causing a propulsion member to apply a separating force to an extension disposed on the arm. The exerted separating force of propulsion member contacting the extension causes the arm to release the base member into the open or unlocked position. The device includes a holding interface defined by an abutment portion of the arm and an elongated aperture disposed in the base member for receipt of the abutment portion when the device is in the locked or closed position. When the hunting dog places a puffing pressure on the tether, the first end positions and catches between the abutment portion and elongated aperture. The tether will then remain secured as described until the hunter elects to remotely release the arm and allow the animal to run free.

10 Claims, 4 Drawing Sheets

(56) References Cited

U.S. PATENT DOCUMENTS

| | | | | |
|---|---|---|---|---|
| 8,196,377 | B1* | 6/2012 | Putty | B68C 1/00 24/603 |
| 9,071,387 | B1* | 6/2015 | Dunnigan | H04K 3/92 |
| 10,111,409 | B2* | 10/2018 | Gardner | F16B 45/025 |
| 2003/0102679 | A1* | 6/2003 | Tillman | A01K 15/003 292/201 |
| 2012/0240867 | A1* | 9/2012 | Flynn | A01K 1/04 119/721 |
| 2016/0286764 | A1* | 10/2016 | Clark | A01K 27/005 |
| 2018/0303066 | A1* | 10/2018 | Weimin | A01K 27/009 |

\* cited by examiner

QUICK RELEASE DEVICE

CROSS REFERENCES TO RELATED APPLICATIONS

U.S. Provisional Application for Patent No. 62/409,593, filed Oct. 18, 2016, with title "Quick Release Device" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

The present invention is directed to a quick release device that can be quickly uncoupled to allow an object to be released from a tether. More particularly, the quick release can be triggered manually or from a hand-controlled remote control.

2. Brief Description of Prior Art

In many applications, it is desirable to release an object from a tether quickly, easily and remotely, as for example, there are various lifting applications often found on construction job sites. In other applications, such as the example primarily described in this disclosure, a quick release tether facilitates handling of an animal for example, such as a hunting dog, by persons who desire not to readily manipulate a conventional latch for a leash.

In hunting, it is often desirable to release an animal from its leash without having hold of the leash itself. For example, if the hunter is at one location, and the hunting dog is secured near but not directly at the hunter's location, the hunter may wish to unleash his dog quickly and without having to again, physically manipulate the conventional leash. As another example, if a guard dog is secured in the owner's backyard and the owner suspects a prowler is in the area, the owner may wish to unleash his guard dog from the safety of his own home.

Accordingly, there is a need for a quick release device that can be easily operated by anyone either by manual release of the device itself or a remote device to release the device and avow the animal, for example, to run free.

It is well recognized that leash structures, collars, harnesses, etc., are available in numerous and varying designs intended to control an animal for different purposes. However, the prior art does not allow for truly remote release of the object or animal, that is, without the user holding or in contact with the tether or leash; nor does the prior art disclose such a quick release mechanism that is simple, reliable and inexpensive to manufacture. Accordingly, there is a need for such a quick release device.

SUMMARY OF THE INVENTION

A quick release device that includes a base member and an arm hingedly attached to the base member. The base member is a housing that may include a battery pack which provides power for a radio receiver housed inside the base member, and for a solenoid which actuates a coupling mechanism having principal parts that couple the base member and arm together in a locked position and separate or release the two (2) components upon command in order to disengage a tether from an object or animal collar for example, thereby allowing the animal to run free.

In application, an opposite end of the tether can be tied to an anchor disposed on a lower portion of the base member and a first end of the tether is passed through the hunting dog's collar between the dog's neck area and collar, and then passed between the base member and arm while in the open, unlocked position. Urging the arm to the locked position catches and secures the first end of the tether so that the hunting dog is releasably secured.

A remotely located radio transmitter is actuated by the hunter to broadcast a radio frequency to the radio receiver inside the base member. The receiver is electrically connected to the solenoid which actuates the coupling mechanism. Transmitting a radio signal from the remotely located radio transmitter to the radio receiver, will cause the solenoid to disengage the coupling mechanism causing a propulsion member to drive or push forward and apply a separating force to an extension disposed on the arm. The exerted separating force of propulsion member contacting the extension causes the arm to release the base member into the open or unlocked position.

The device further includes a holding interface defined by an abutment portion of the arm and an elongated aperture disposed in the base member for receipt of the abutment portion when the device is in the locked or closed position.

In application, when the device is in the locked position with the first end of the tether between the base member and arm as described, when the object or hunting dog for example places pressure on the tether, the first end positions and catches between the abutment portion and elongated aperture. The tether will then remain secured as described until the hunter elects to remotely release the arm and avow the animal to run free.

The hunter can remotely release the arm to the unlocked position thereby releasing the first end of the tether so that the hunting dog is free to run. When the hunting dog begins running, the first end of the tether simply passes through the hunting dog's collar as it runs.

DESCRIPTION OF THE PREFERRED EMBODIMENT

Figure 1:
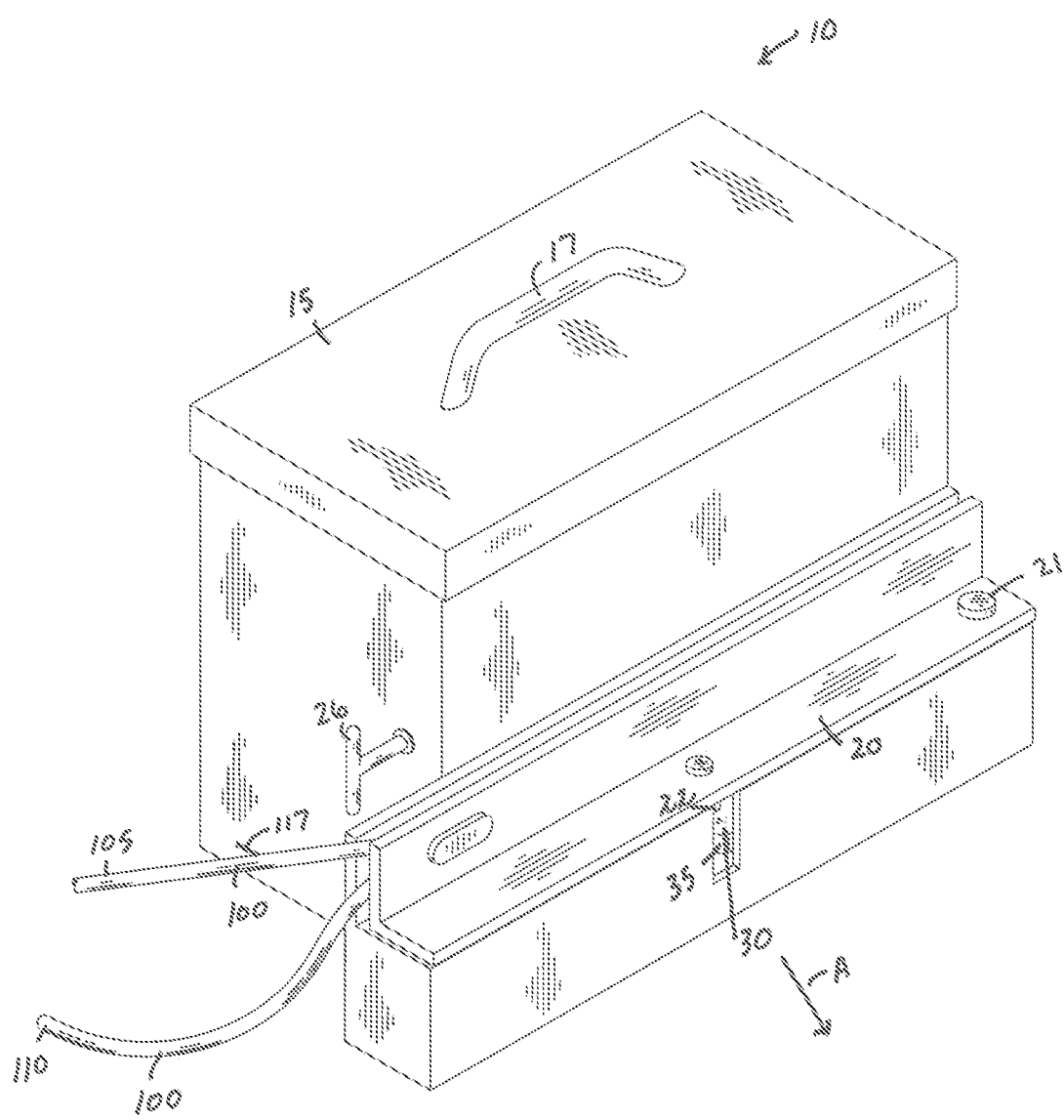
FIG. 1 is a front perspective view of an example embodiment of a quick release device with a holding interlace in a closed or locked position with the arm's extension member removed in order to show the coupling mechanism.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The quick release device of the present invention is generally directed to a remotely controlled device that can be quickly uncoupled to an object to allow the object to be released from a tether. For example, in application with a hunting dog, the hunting dog is secured at a first location and the hunter can be at a nearby second location. When the hunter shoots and kills a game bird for example, the hunter can quickly and immediately unleash the hunting dog from the device without having to physically manipulate the leash and avow the hunting dog to run free and collect the game bird.

The quick release device of the present invention is simple to operate, reliable, and simple and inexpensive to manufacture. As will be discussed, the quick release device as disclosed consists of components configured and correlated with respect to each other so as to attain the desired objective.

In accordance with the present invention, there is provided a quick release device designated as numeral 10 that generally includes a base member 15 and an arm 20 hingedly attached 21 to the base member 15.

The base member 15 is a housing that defines a chamber 16 that is preferably sized for receiving a battery pack 18. The battery pack 18 provides power for a radio receiver 23 preferably housed in the chamber 16 of the base member 15. A solenoid 22 is preferably also contained within the chamber 16, the solenoid 22 configured to actuate a coupling mechanism 30 having principal parts that couple together in a locked position and separate upon command to disengage the tether from an animal collar for example, thereby allowing the animal to run free. The coupling mechanism 30 is discussed in greater detail below. The radio receiver 23 may include an antenna (not shown) preferably housed inside the chamber 16 to reduce the potential for damage to it if it were extending from the outside of the base member 15. As illustrated, the base member 15 may further include at least one handle 17.

As will be understood, in application, an opposite end 110 of a tether 100 (leash) can be tied to an anchor 17 disposed on a lower portion of the base member 15. In the alternative, the opposite end 110 can be tied to a permanent structure disposed near the device 10 such as a tree, or the like.

A first end 105 of the tether 100 is merely passed through the hunting dog's collar (not shown) between the dog's neck area and collar, and then situated between the base member 15 and arm 20 while in the open, unlocked position as shown in FIGS. 1,3,4 and 5. Urging the arm 20 to the locked position as shown in FIG. 1 catches and secures the first end 105 of the tether 100 so that the hunting dog is releasably secured.

Once the hunter shoots and kills a game bird for example, the hunter can remotely release the arm 20 to the unlocked position (FIG. 2) thereby releasing the first end 105 of the tether 100 so that the hunting dog is free to run. When the hunting dog begins running, the first end 105 of the tether 100 simply passes through the hunting dog's collar as it runs to collect the killed game.

Figure 2:
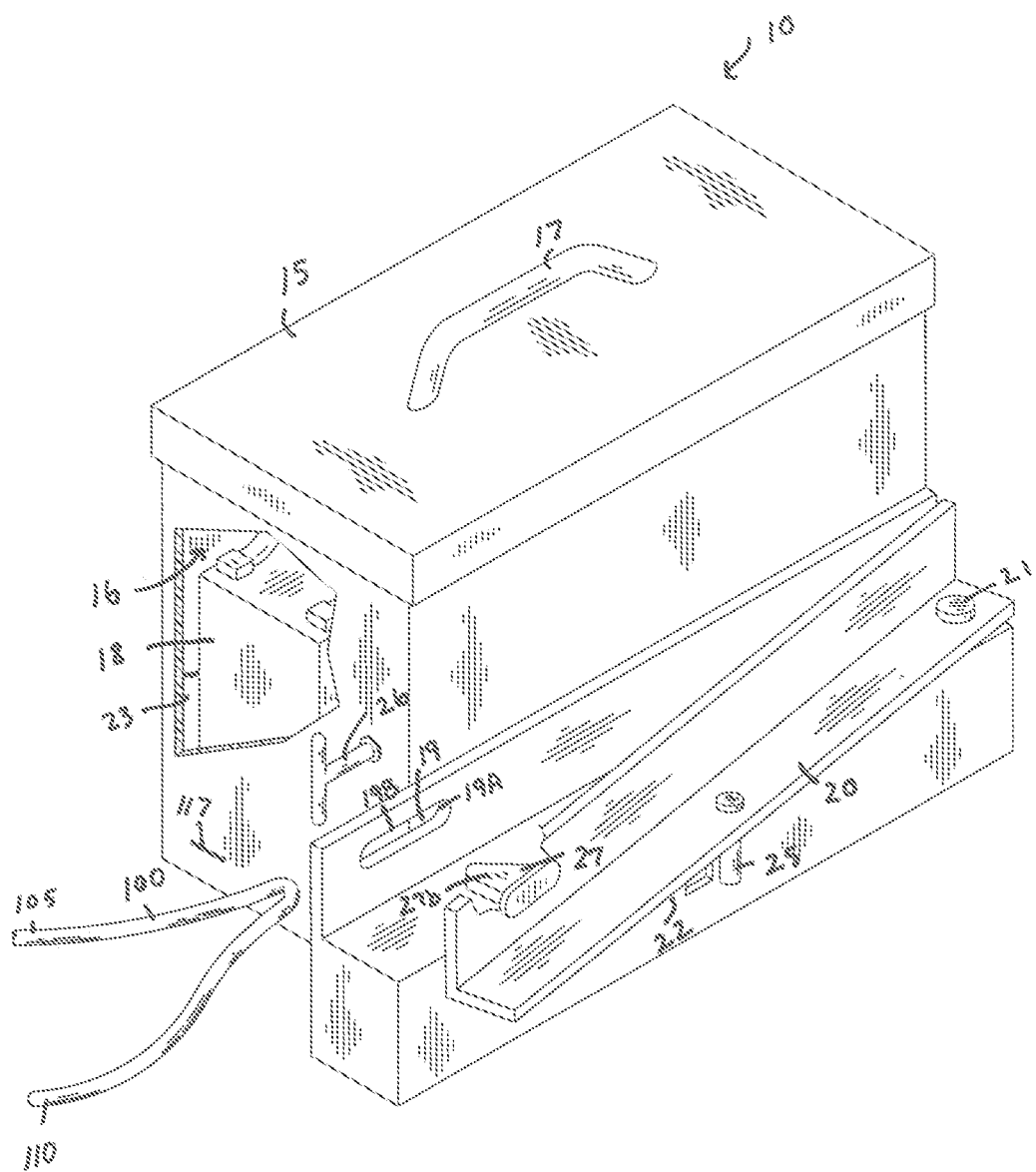
FIG. 2 is a front perspective view of the device of FIG. 1 in an open or unlocked position, with a section of the arm removed to show the abutment portion, and a section of the base member removed to show the battery.

A remotely located radio transmitter (not shown) is actuated by the hunter to broadcast a radio frequency to the radio receiver 23 inside the chamber 16. The receiver 23 is electrically connected to the solenoid 22 which actuates the coupling mechanism 30. Transmitting a radio signal (or other type signal) from the remotely located radio transmitter to the radio receiver 23, will cause the solenoid 22 to disengage the coupling mechanism 30 causing a propulsion member 35 to drive or push forward in the direction of arrow A in FIG. 1. When the propulsion member 35 drives forward in the direction of arrow A, it comes in contact with and applies a separating force to an extension member 25 disposed on a lower surface 22 of arm 20. The exerted separating force of propulsion member 35 contacting extension member 25 generally causes the arm 20 to release the base member 15 into the open or unlocked position as shown in FIG. 2.

The device 10 includes a complementary holding interface defined by an abutment portion 27 of the arm 20 comprising a top surface 27b and a sloping surface extending downwardly from its apex 27a (see FIG. 5), which "complements" the abutment portion 27 thereby defining one component of the described complementary locking interface. The base member 15 includes an elongated aperture 19 (see FIG. 3) for receipt of the abutment portion 27 when the device 10 is in the locked or dosed position.

Figure 3:
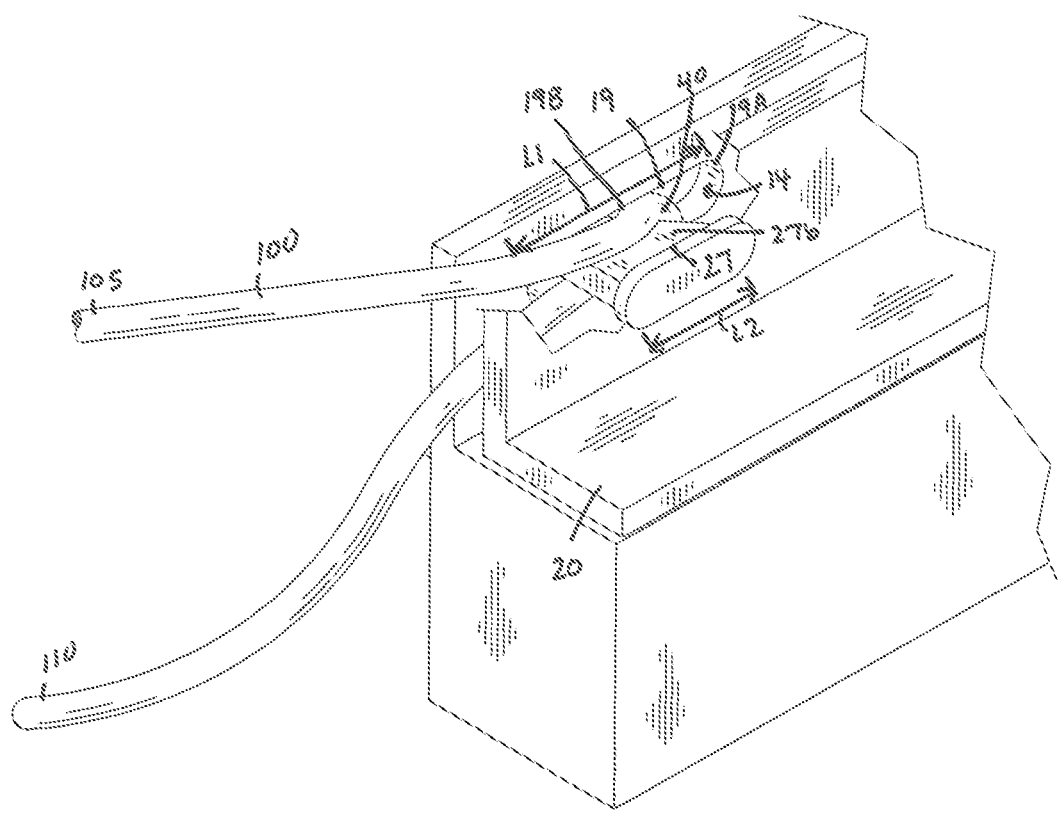
FIG. 3 is a close-up view of a section view of the arm removed to show the abutment portion in the locked position with the elongated aperture of the base member, and with a tether secured therein.
Figure 4:
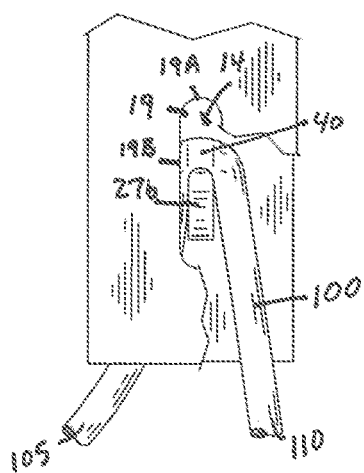
FIG. 4 is a dose-up top view of what is illustrated in FIG. 3.
Figure 5:
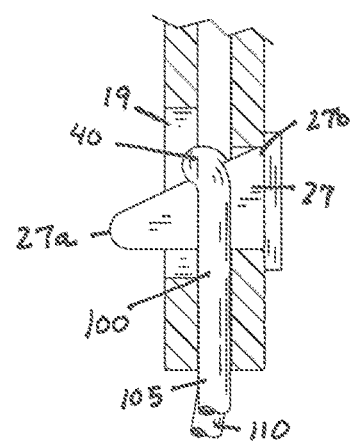
FIG. 5 is a close-up side sectional view of what is illustrated in FIG. 3.

The elongated aperture 19 defines a length L1 that is at least slightly longer than the length L2 of the base 27B of the abutment portion 27 of the arm 20 such that a defined spacing 14 is disposed at the back end 19A of the aperture 19 when the arm 20 is in the locked position. As will be understood, the spacing 14 is configured for receiving a portion 40 of the leash 100 during application. In particular, and as shown in FIGS. 3-5, when in the locked position as described, the leash 100 is caught or "crimped" within the spacing 14 between an upper portion 19B of the aperture 19 and the abutment portion 27 limiting movement of the leash 100.

Similar to the coupling mechanism 30 previously described, the coupling mechanism 30 of the present invention may comprise any one of a number of electrically actuated devices including, by way of example only and in no matter limited to, solenoids, electromagnetics, capacitors, electric motors, etc. It is understood that any coupling mechanism which may affect the disposition of the propulsion member 35 between the locked or closed configuration and the open, released or separated configuration upon application of an electrical current may be utilized and are encompassed in the scope of the present invention.

As already discussed, in application, the first end 105 of the tether 100 is passed between the base member 15 and arm 20 when in the open position. The device is placed in the locked position by urging the abutment portion 27 into the elongated aperture 19 which also retracts the propulsion member 35. In the locked position with the first end 105 of the tether 100 therebetween as described, when the object or hunting dog for example places a pulling pressure on the tether, the first end 105 immediately positions and catches at location 40 within the spacing 14 between the abutment portion 27 and elongated aperture 19. The tether 100 will then remain secured as described until the hunter elects to remotely release the arm 20 as previously described and avow the animal to run free.

The remote controlled quick release device 10 can be actuated to release the tethered object in any of two (2) independent methods: (1) by transmitting a radio signal (or other signal) from the remotely located radio transmitter to the radio receiver which causes the solenoid to disengage the coupling mechanism 30; (2) by manually urging a switch 26 on the exterior of the base member 15 which mechanically disengages the coupling mechanism 30.

As now should be understood, in operation, when the solenoid 21 is actuated and the propulsion member 35 contacts the extension 25 of the arm 20, the exerted force caused by the propulsion member 35 to the extension 25 releases the abutment portion 27 from the elongated aperture 19 thereby releasing the first end 105 of the tether 100. And, in the manually operated embodiment, the coupling mechanism 30 acts identical to the coupling mechanism of the electrically remote control embodiment except that there is no solenoid.

In the preferred embodiment, it is desirable to provide a waterproof base member 15 housing the electrical components and solenoid which may be also be coated with waterproof plastic or the like.

The base member 15 and arm 20 may comprise any of a variety of materials of construction, which will typically be dictated by the load to be placed on the device 10 in a particular application. For example, in a light duty application, such as securing a relatively small animal, the base member 15 and the arm 20 may comprise of plastic, aluminum, or another lightweight material for ease of carrying, while permitting secure attachment of the components. Alternatively, for heavy duty applications, the components may be constructed of hardened steel, stainless steel, or any one of a number of other metals, metal alloys, or specialty materials to assure security attachment is maintained between the components for the specific application.

Although the above description contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

It would be obvious to those skilled in the art that modifications may be made to the embodiments described above without departing from the scope of the present invention, Thus the scope of the invention should be determined by the appended claims in the formal application and their legal equivalents, rather than by the examples given.

We claim:

1. A quick release device comprising:
   a base member and an L-shaped arm hingedly attached to an exterior surface of the base member, said L-shaped arm defining a vertical portion and a horizontal portion, said base member includes a chamber sized for receiving a battery pack that provides power for a radio receiver, said base member further defines an elongated aperture for releasably receiving an abutment portion that is configured to extend from said vertical portion of said arm through said elongated aperture, said abutment portion having a top surface and a side surface that slants downwardly from said top surface,
   a solenoid operable with a propulsion member of a coupling mechanism configured to push an extension that is disposed on a lower surface of said horizontal portion of said arm in a forward direction and apply a separating force to said extension causing said arm to hingedly release from said base member thereby causing said abutment portion to separate from said elongated aperture and placing said coupling mechanism in an unlocked position and wherein said elongated aperture defines a first length that is at least slightly longer than a second length of a base of said abutment portion such that a defined spacing is disposed at a back end of the elongated aperture when said abutment portion is received therein,
   a tether having a first end coupled to an anchor, and a second, opposite end, and wherein said defined spacing is configured for receiving said second end of said tether such that in the locked position a portion of said second end of the tether is caught within the defined spacing between an upper edge of said elongated aperture and the abutment portion.

2. The device of claim 1, wherein said anchor is disposed on a lower portion of said base member.

3. The device of claim 2, wherein said abutment portion comprises a sloping surface.

4. The device of claim 3, wherein said defined spacing is adjacent said sloping surface.

5. A quick release device comprising:
   a base member and an arm rotatably attached to an exterior surface of the base member, said arm includes an abutment portion configured to extend from a vertical portion of said arm through an elongated aperture of said base member,
   a solenoid operable with a propulsion member of a coupling mechanism configured to push an extension that is disposed on a lower surface of said arm in a forward direction and apply a separating force to said extension causing said extension to separate from said base member thereby releasing said abutment portion from said elongated aperture and placing said coupling mechanism in an unlocked position.

6. The device of claim 5, wherein said elongated aperture defines an aperture length that is longer than a length of a base of said abutment portion such that a defined spacing is disposed at a back end of the elongated aperture when said abutment portion is received therein.

7. The device of claim 6, wherein said defined spacing is configured for receiving a portion of a first end of a tether such that in the locked position the portion of the tether is caught within the defined spacing between an upper edge of said elongated aperture and the abutment portion limiting movement of the tether.

8. The device of claim 7, further including an anchor member disposed on a lower portion of said base member and wherein a second, opposite end of said tether is connected to said anchor member.

9. The device of claim 8, wherein said abutment portion comprising a sloping surface.

10. The device of claim 9, wherein said defined spacing is adjacent said sloping surface.

* * * * *